United States Patent
Aoyama

(10) Patent No.: US 8,295,587 B2
(45) Date of Patent: Oct. 23, 2012

(54) IMAGE PROCESSING APPARATUS, IMAGE PROCESSING METHOD, IMAGE PROCESSING PROGRAM AND POSITION DETECTING APPARATUS AS WELL AS MOBILE OBJECT HAVING THE SAME

(75) Inventor: Chiaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 991 days.

(21) Appl. No.: 12/314,198

(22) Filed: Dec. 5, 2008

(65) Prior Publication Data

US 2009/0148036 A1 Jun. 11, 2009

(30) Foreign Application Priority Data

Dec. 7, 2007 (JP) ................. 2007-316511

(51) Int. Cl.
*G06K 9/00* (2006.01)
(52) U.S. Cl. ...................................... 382/154
(58) Field of Classification Search .............. 382/154; 348/46, 47; 356/3.13, 3.14
See application file for complete search history.

(56) References Cited

U.S. PATENT DOCUMENTS

| | | | |
|---|---|---|---|
| 6,011,863 A * | 1/2000 | Roy ............................. | 382/154 |
| 6,507,665 B1 * | 1/2003 | Cahill et al. ................. | 382/154 |
| 2004/0196451 A1 | 10/2004 | Aoyama ................... | 356/139.03 |
| 2006/0115117 A1 * | 6/2006 | Nagaoka et al. .............. | 382/104 |

FOREIGN PATENT DOCUMENTS

| JP | 5-165957 A | 7/1993 |
|---|---|---|
| JP | 2004-309318 A | 11/2004 |

OTHER PUBLICATIONS

Abraham, Steffen et al., "Fish-Eye-Stereo Calibration and Epipolar Rectification", ISPRS Journal of Photogrammetry & Remote Sensing, 2005, pp. 278-288.
Roy, Sebastien et al., "Cylindrical Rectification to Minimize Epipolar Distortion", IEEE, 1997, pp. 393-399.
European Search Report application No. 08253906.5 dated Apr. 12, 2011.

\* cited by examiner

*Primary Examiner* — Andrew W Johns
(74) *Attorney, Agent, or Firm* — Squire Sanders (US) LLP

(57) ABSTRACT

There is provided an image processing apparatus capable of reducing a memory amount to be used and a processing time in processing images captured stereoscopically in wide-angle. In order to find pixel positions of an object as information for use in detecting position of the object from images captured by two cameras that are capable of imaging the object in wide-angle and are disposed on a straight line, the image processing apparatus includes an image input means for inputting the images captured by the two cameras, an image projecting means for projecting the images inputted from the respective cameras on a cylindrical plane having an axial line disposed in parallel with the straight line on which the respective cameras are disposed while correcting distortions and a pixel position detecting means for detecting the pixel positions corresponding to the object in the image projected on the cylindrical plane.

6 Claims, 14 Drawing Sheets

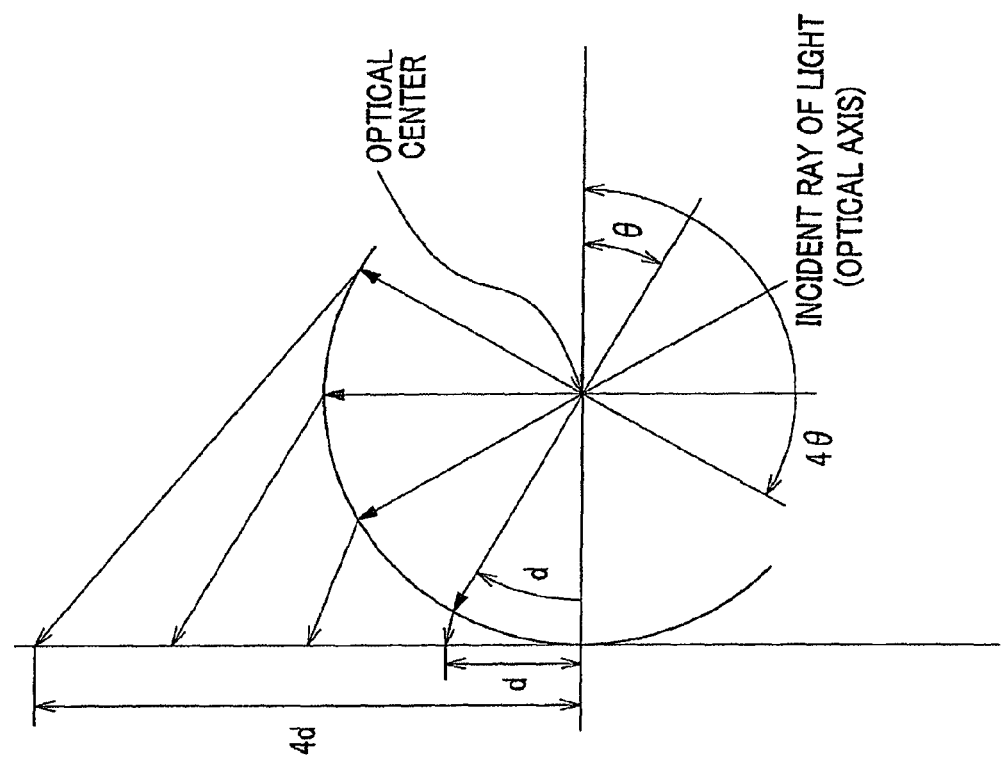
FIG.2A CENTER PROJECTION
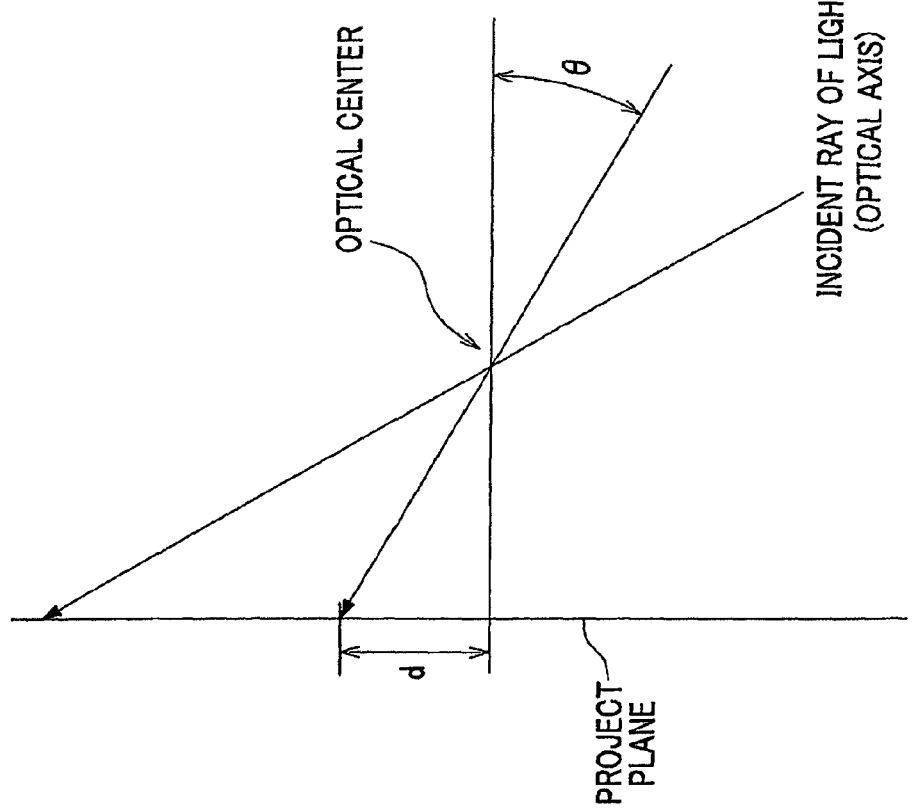
FIG.2B CYLINDRICAL PROJECTION

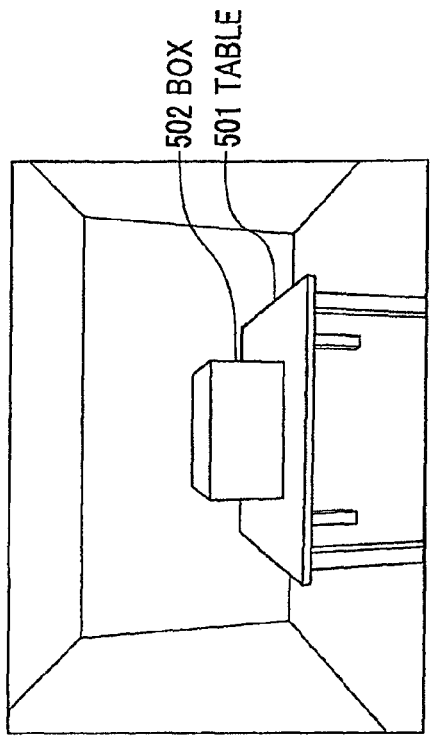
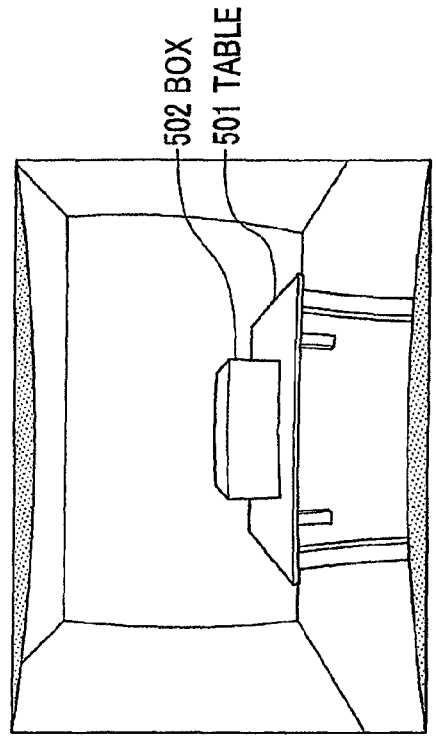
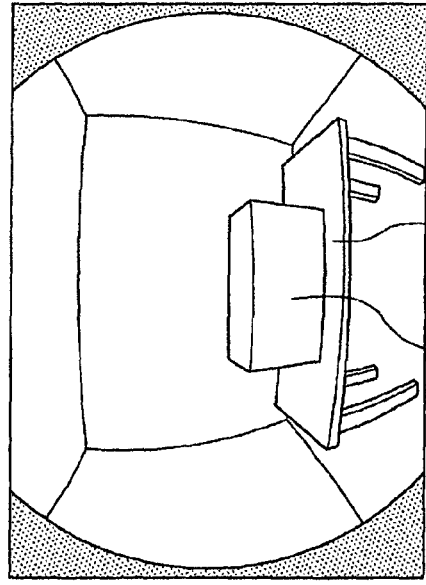

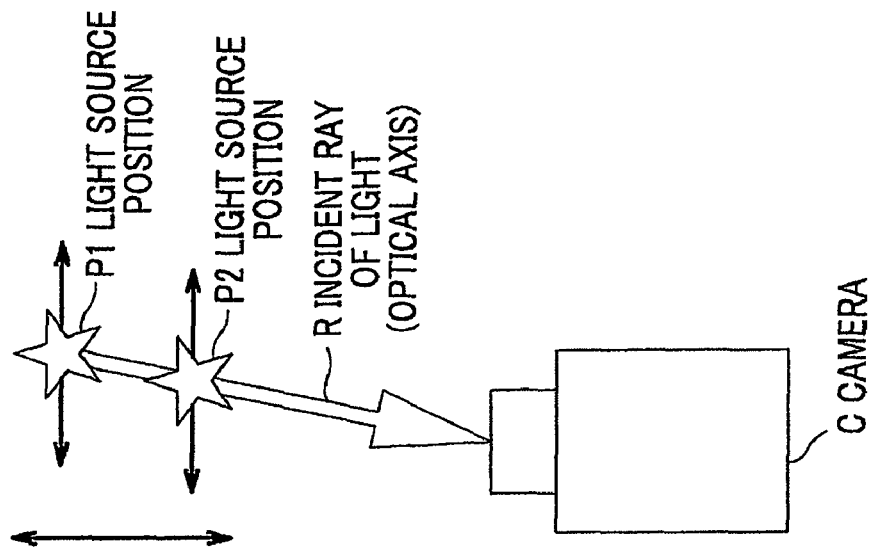
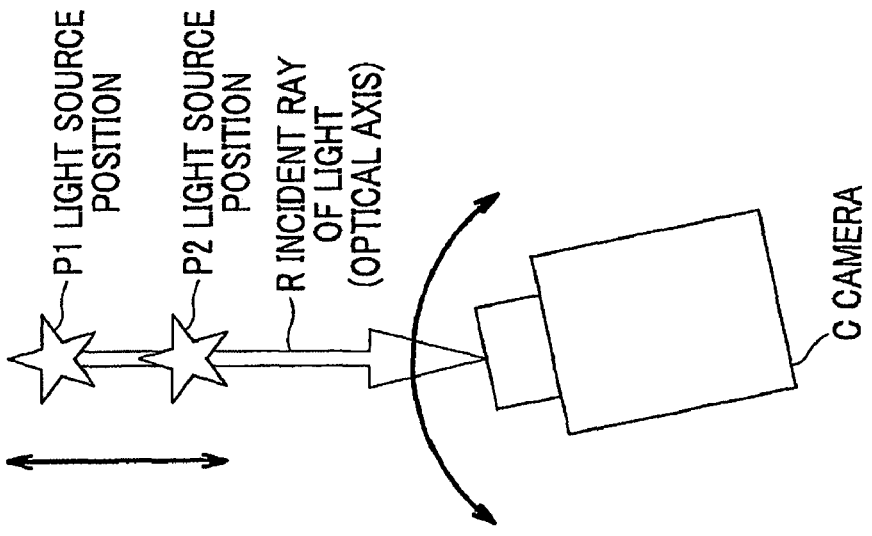

FIG.12A CORRECTION TABLE

| x COORDINATE | y COORDINATE | $K_1$ | $K_2$ | $K_3$ | $K_4$ |
|---|---|---|---|---|---|
| 0 | 0 | | | | |
| 1 | 0 | | | | |
| 3 | 0 | | | | |
| . | . | | | | |
| . | . | | | | |
| . | . | | | | |

FIG.12B DIRECTIONAL VECTOR TABLE

| u COORDINATE | v COORDINATE | $\alpha_R$ | $\alpha_L$ | $\gamma$ |
|---|---|---|---|---|
| 0 | 0 | 45.51 | 58.23 | 24.81 |
| 1 | 0 | 45.50 | 58.22 | 24.81 |
| 3 | 0 | 45.50 | 58.22 | 24.81 |
| . | . | . | . | . |
| . | . | . | . | . |
| . | . | . | . | . |
| 768 | 0 | . | . | . |
| 0 | 1 | . | . | . |
| 1 | 1 | . | . | . |
| . | . | . | . | . |
| . | . | . | . | . |

FIG.13A CALIBRATION TABLE

| x COORDINATE | y COORDINATE | dx | dy | dz | $\alpha$ | $\gamma$ |
|---|---|---|---|---|---|---|
| 0 | 0 | 0.01 | 0.02 | -0.01 | 58.231 | 24.81 |
| 1 | 0 | 0.009 | 0.02 | -0.01 | 58.22 | 24.81 |
| 2 | 0 | 0.009 | 0.02 | -0.01 | 58.219 | 24.81 |
| . | . | . | . | . | . | . |
| . | . | . | . | . | . | . |
| . | . | . | . | . | . | . |
| 768 | 0 | . | . | . | . | . |
| 0 | 1 | . | . | . | . | . |
| 1 | 1 | . | . | . | . | . |
| . | . | . | . | . | . | . |
| . | . | . | . | . | . | . |

FIG.13B DISTORTION CORRECTION TABLE

| x COORDINATE | y COORDINATE | du | dv |
|---|---|---|---|
| 0 | 0 | 18 | 25 |
| 1 | 0 | 18 | 25 |
| 3 | 0 | 18 | 24 |
| . | . | . | . |
| . | . | . | . |
| . | . | . | . |
| 768 | 0 | . | . |
| 0 | 1 | . | . |
| 1 | 1 | . | . |
| . | . | . | . |
| . | . | . | . |

IMAGE PROCESSING APPARATUS, IMAGE PROCESSING METHOD, IMAGE PROCESSING PROGRAM AND POSITION DETECTING APPARATUS AS WELL AS MOBILE OBJECT HAVING THE SAME

CROSS REFERENCE TO RELATED APPLICATIONS

This application claims the foreign priority benefit under Title 35, United States Code, §119 (a)-(d) of Japanese Patent Application No. 2007-316511, filed on Dec. 7, 2007 in the Japan Patent Office, the disclosure of which is herein incorporated by reference in its entirety.

BACKGROUND OF THE INVENTION

1. Field of the Invention

The present invention relates to an image processing technology for processing a plurality of images of an object captured by a plurality of cameras and to a position detecting technology for detecting position of the object from image processing results.

2. Description of Related Art

Heretofore, there has been known a technology of picking out three-dimensional features of an object such as an obstacle by processing its images captured by using a type of lens corresponding to a projection plane in a field of motion stereo vision of gaining a stereoscopic sense from a motion parallax generated when a mobile object such as a robot moves as disclosed in Japanese Patent Laid-open No. Hei. 5-165957 (paragraphs [0060] and [0061] and FIG. 14) for example. JP Hei. 5-165957A discloses an image processing method that assimilates a retinal area (receptive field) of animals to reduce a processing time by cutting up an input image and conducting polarity conversion on a spherical surface (receptive field method). This receptive field method prescribes three types of projection of spherical plane projection, cylindrical plane projection and plain plane projection.

Among them, the spherical plane projection is a projection method of projecting an image on a spherical surface and provides a broadest visual field and an image equivalent to the projected image by a fish-eye lens. The cylindrical plane is a projection method of projecting an image on a cylindrical plane and provides a broad visual field in an angular direction of the cylinder even though a visual field in an axial direction thereof is limited. This method provides an image equivalent to the projected image by a cylindrical lens. The plain plane projection is a projection method of projecting an image plainly and provides a narrowest visual field. This method provides an image equivalent to the projected image by a standard and/or telephotographic lens. It is noted that the image processing method described in JP Hei. 5-165957A relates to the motion stereo vision and is not what detects position of an object accurately from the stereo image.

Japanese Patent Laid-open No. 2004-309318 (paragraphs [0060] and [0077], FIG. 7) describes a technology of detecting position of an object by processing stereo images obtained by using two cameras. A calibration information generating apparatus and a position detecting apparatus described in JP 2004-309318A operate as follows. That is, the calibration information generating apparatus of JP 2004-309318A measures calibration data per pixel captured by each camera to generate calibration information (calibration table) per camera. Then, the position detecting apparatus detects the position of the object by removing distortions of the captured images based on the stereo images obtained by using the two right and left cameras and the calibration information (calibration tables). Here, it is assumed to use a wide-angle lens such as a fish-eye lens and others as lenses of the cameras.

It is noted that the stereo images obtained by using the two right and left cameras are transformed into screen coordinates so that center projection is attained while performing distortion correction on a plane where right and left epi-polar lines coincide. When a transverse (horizontal) direction of an incident ray of light (optical axis) is denoted by $\alpha$ and a vertical (perpendicular) direction thereof by $\gamma$, position (u, v) thereof on a screen may be represented by Equations 1a and 1b as follows. Where, k1 and k2 are predetermined constants.

$$u = k1 \tan\alpha \quad \text{Eq. 1a}$$

$$v = k2 \tan\gamma \quad \text{Eq. 1b}$$

However, the prior art image processing method by way of the stereo vision has had the following problems when an input image is an image captured by a fish-eye lens for example.

That is, a center part (low-angle part) of the image where image resolution is relatively high is compressed when the image is projected on a plain plane by way of the center projection in utilizing a high-angle part of the image close to 90 degrees of incident angle in the vertical (perpendicular) direction for example in the prior art image processing method. Due to that, if the image at the center part (low-angle part) is used to measure the position in the image whose center part is compressed as described above, precision of the measurement inevitably drops. If the center part of the image is not compressed in contrary, the prior art method incurs waste in terms of a memory amount to be used and of a calculation time because an information amount of the low-angle image at the center part is larger than that of the image at the high-angle part and a peripheral image (at the high-angle part) where the resolution is low is complemented in the same manner when the complementation is carried while adjusting to the resolution of the center low-angle image.

Accordingly, the present invention seeks to solve the aforementioned problems and to provide an image processing technology allowing a memory amount to be used and a processing time to be reduced in processing images captured in wide-angle by way of the stereo vision.

SUMMARY OF THE INVENTION

According to a first aspect of the invention, there is provided an image processing apparatus for finding pixel positions of an object as information for use in detecting position of the object from images captured by two cameras that are capable of imaging the object in wide-angle and are disposed on a straight line. The image processing apparatus includes an image input means for inputting the images captured by the two cameras, an image projecting means for projecting the images inputted from the respective cameras on a cylindrical plane having an axial line disposed in parallel with the straight line on which the respective cameras are disposed and a pixel position detecting means for detecting the pixel positions corresponding to the object in the image projected on the cylindrical plane.

By constructing as described above, the image projecting means of the image processing apparatus projects the images inputted from the respective cameras capable of imaging in wide-angle on the cylindrical plane having the axial line disposed in parallel with the straight line on which the two cameras are disposed. Thereby, the image projected is homogeneously projected from part of the image around a center part where an angle of incident ray of light is low to part of the image at high angle in a direction perpendicular to the axial line of the cylinder.

Here, the camera capable of imaging in wide-angle includes a fish-eye lens. The image projecting means can project the input image captured by the fish-eye lens capable of imaging incoming light whose angle range exceeds 180 degrees (e.g., 200 degrees) because the image projecting means projects the input image on the cylindrical plane. Accordingly, because the image at the high-angle part is elongated even though the image at the center part (low-angle part) is compressed in the direction perpendicular to the axial line of the cylinder when the image at the high angle part where an incident angle is 90 degrees or more for example is to be used, an information amount of the image may be homogenized as compared to the prior art case of using an image projected on a plain plane by way of center projection. As a result, it becomes possible to reduce a memory to be used and a calculation time as compared to the past one. It is noted that it is unable to project the part corresponding to the incoming light whose angle exceeds 180 degrees when the center projection is used.

Then, the image processing apparatus detects the pixel positions corresponding to the object in the image projected on the cylindrical plane by the pixel position detecting means. Here, because the straight line on which the two cameras are disposed is parallel with the axial line of the cylinder, their epi-polar line is straight in the image projected on the cylindrical plane. Accordingly, it is possible to detect the pixel position readily by scanning corresponding pixels on the straight line in stereo matching in the same manner with the prior art plain projection by projecting on the cylindrical plane, differing from spherical projection. That is, no extra memory to be used and calculation time is generated in the stereo matching by projecting on the cylindrical plane.

According to a second aspect of the invention, the image projecting means of the image processing apparatus projects the inputted images on the cylindrical plane while correcting distortions of the images.

By constructing as described above, because the image projecting means of the image processing apparatus projects the input image on the cylindrical plane while correcting the distortions thereof, i.e., while correcting the distortions caused by the camera capable of imaging in wide-angle, differing from a camera equipped with a standard lens or a telephotographic lens, it becomes possible to accurately detect the position of the object from stereoscopic images by using projected images. Here, the method of projecting the images while correcting the distortions may be carried out by correcting the distortions simultaneously with the projection or by projecting images from which distortions of the input images have been corrected in advance for example.

According to a third aspect of the invention, there is provided an image processing method of an image processing apparatus for finding pixel positions of an object as information for use in detecting position of the object from images captured by two cameras that are capable of imaging the object in wide-angle and are disposed on a straight line. The method includes steps of inputting the images captured by the two cameras, projecting the images inputted from the respective cameras on a cylindrical plane having an axial line disposed in parallel with the straight line on which the respective cameras are disposed and detecting the pixel positions corresponding to the object in the image projected on the cylindrical plane.

According to the procedure described above, the image processing apparatus projects the image inputted from each camera on the cylindrical plane having the axial line disposed in parallel with the straight line on which the two cameras are disposed in the image projecting step and detects the pixel position corresponding to the object in the image projected on the cylindrical plane in the pixel position detecting step. Accordingly, it becomes possible to homogenize an information amount of the image as compared to the prior art case of using the image projected on a plain plane by way of the center projection when the image of the high-angle part whose incident angle is 90 degrees or more is to be used. As a result, it becomes possible to reduce a memory amount to be used and a calculation time as compared to the prior art method. Still more, no extra memory to be used and calculation time is generated in the stereo matching by projecting on the cylindrical plane.

According to a fourth aspect of the invention, there is provided an image processing program for operating a computer to find pixel positions of an object as information for use in detecting position of the object from images captured by two cameras that are capable of imaging the object in wide-angle and are disposed on a straight line. The program operates the computer as an image input means for inputting the images captured by the two cameras, an image projecting means for projecting the images inputted from the respective cameras on a cylindrical plane having an axial line disposed in parallel with the straight line on which the respective cameras are disposed and a pixel position detecting means for detecting the pixel positions corresponding to the object in the image projected on the cylindrical plane.

By constructing as described above, the image processing program operates the computer such that the image projecting means projects the images inputted from the respective cameras on the cylindrical plane having the axial line disposed in parallel with the straight line on which the two cameras are disposed and the pixel position detecting means detects the pixel positions corresponding to the object in the image projected on the cylindrical plane. Accordingly, it becomes possible to reduce a memory amount to be used and a calculation time as compared to a prior art program.

According to a fifth aspect of the invention, there is provided a position detecting apparatus including the image processing apparatus described in the first or second aspect and a storage means for storing calibration information correlating a direction of an incident ray of light and a displacement from a reference position to the incident ray of light per camera. The position detecting apparatus obtains the direction of the incident ray of light and its displacement corresponding to the pixel position from the calibration information based on the pixel position correlated to each image of the object captured by each camera to calculate the position of the object by using this direction of the incident ray of light and its displacement.

By constructing as described above, the position detecting apparatus can reduce the memory to be used and the calculation time of the image processing apparatus as compared to the prior art one in finding the pixel positions of the object from the image captured by the cameras to calculate the position of the object. Still more, because the position detecting apparatus can recognize the displacement of the incident ray of light inputted to the pixel corresponding to the object of each image as a shift length from the reference position before detecting the position of the object from the captured respective images, the position detecting apparatus can correct and find the accurate position of the object based on the shift length.

According to a sixth aspect of the invention, there is provided a mobile object including a body having the position detecting apparatus described in the fifth aspect and two cameras capable of imaging in wide-angle, disposed on a straight line and outputting captured images of the object to the position detecting apparatus and a moving means for moving the body.

By constructing as described above, the mobile object outputs the images captured by the two cameras provided in the body thereof and capable of imaging in wide-angle to the position detecting apparatus. Accordingly, the mobile subject can perceive a range wider than a range of images outputted from cameras equipped with a standard lens or a telephotographic lens. Therefore, the mobile subject can reduce the memory to be used and the calculation time for perceiving circumstances in moving by the moving means.

As described above, according to the invention, the image processing apparatus can reduce the memory amount to be used and the processing time in processing the images captured in wide-angle by way of the stereo vision.

Still more, the position detecting apparatus having the image processing apparatus can reduce the memory amount to be used and the calculation time in finding the pixel positions of the object from the images captured by the cameras to calculate the position of the object.

Further, the mobile object equipped with the position detecting apparatus can reduce the memory amount to be used and the calculation time for perceiving the circumstances when it moves.

It is noted that the summary of the invention described above does not necessarily describe all necessary features of the invention. The invention may also be a sub-combination of the features described above.

BRIEF DESCRIPTION OF THE DRAWINGS

FIG. 2A is a side view of a projection plane of center projection;

FIG. 2B is a side view of a projection plane of cylindrical projection;

FIG. 5A is an explanatory image of a captured image before being projected;

FIG. 5B is an explanatory image after being projected by way of the center projection;

FIG. 5C is an explanatory image after being projected by way of the cylindrical projection;

FIG. 11A is a conceptual diagram showing a principle for generating a calibration table;

FIG. 11B is a conceptual diagram showing another principle for generating a calibration table;

FIG. 12A shows one exemplary table, i.e., a correction table, stored in storage means;

FIG. 12B shows another exemplary table, i.e., a directional vector table, stored in the storage means;

FIG. 13A shows one exemplary table, i.e., a calibration table, stored in the storage means;

FIG. 13B shows another exemplary table, i.e., a distortion correction table, stored in the storage means.

DETAILED DESCRIPTION OF MOST PREFERRED EMBODIMENT

A best mode (referred to as an embodiment hereinafter) for carrying out an image processing apparatus, a position detecting apparatus and a mobile object of the invention will be explained in detail below with reference to the drawings.

Camera's non-pinhole characteristics that incident rays of light do not cross at one point and that causes distortions in an image captured by the camera having a lens system in general will be explained first and then calibration data obtained by digitizing characteristics of the camera having the non-pinhole characteristics will be explained. After that, a method for generating calibration information (calibration table) by measuring the calibration data per pixel captured by the camera will be explained. Then, a position detecting apparatus for detecting position of an object from the captured images by referring to the calibration information (calibration table) generated by measuring the calibration data per pixel captured by the camera will be explained in this order.

[About Pinhole Camera Model]

Figure 8:
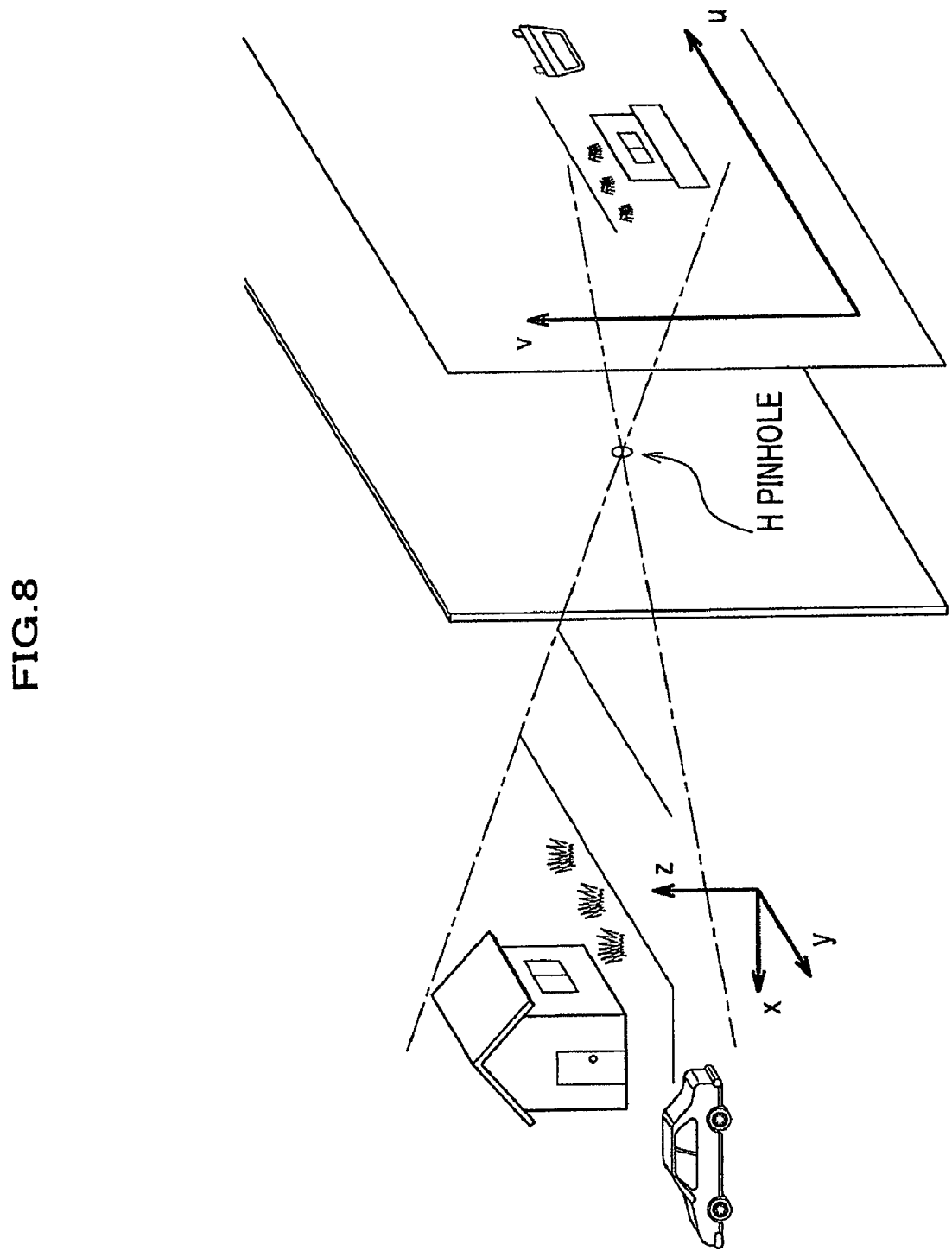
FIG. 8 is an explanatory diagram for explaining a concept of a pinhole camera model.

Heretofore, position of an object has been detected by measuring a distance to the object by using a plurality of cameras such as CD cameras on the principle of triangulation in general based on positions of the respective cameras and respective pixels corresponding to the object in images captured by the respective cameras. It is noted that this method of detecting the position of the object on the principle of triangulation presupposes that a lens system of each camera operates under a pinhole camera model. This pinhole camera model is such a model that only light (incident light) entering through a reference position (pinhole H) reaches on an image plane and that a three-dimensional space (x, y, z) is correlated with a two-dimensional space (u, v) on the image plane as shown in FIG. 8. Thus, the pinhole camera model presupposes that an image is formed by the incident rays of light passing through one point of the pinhole.

[Non-Pinhole Characteristics of Camera]

Figure 9:
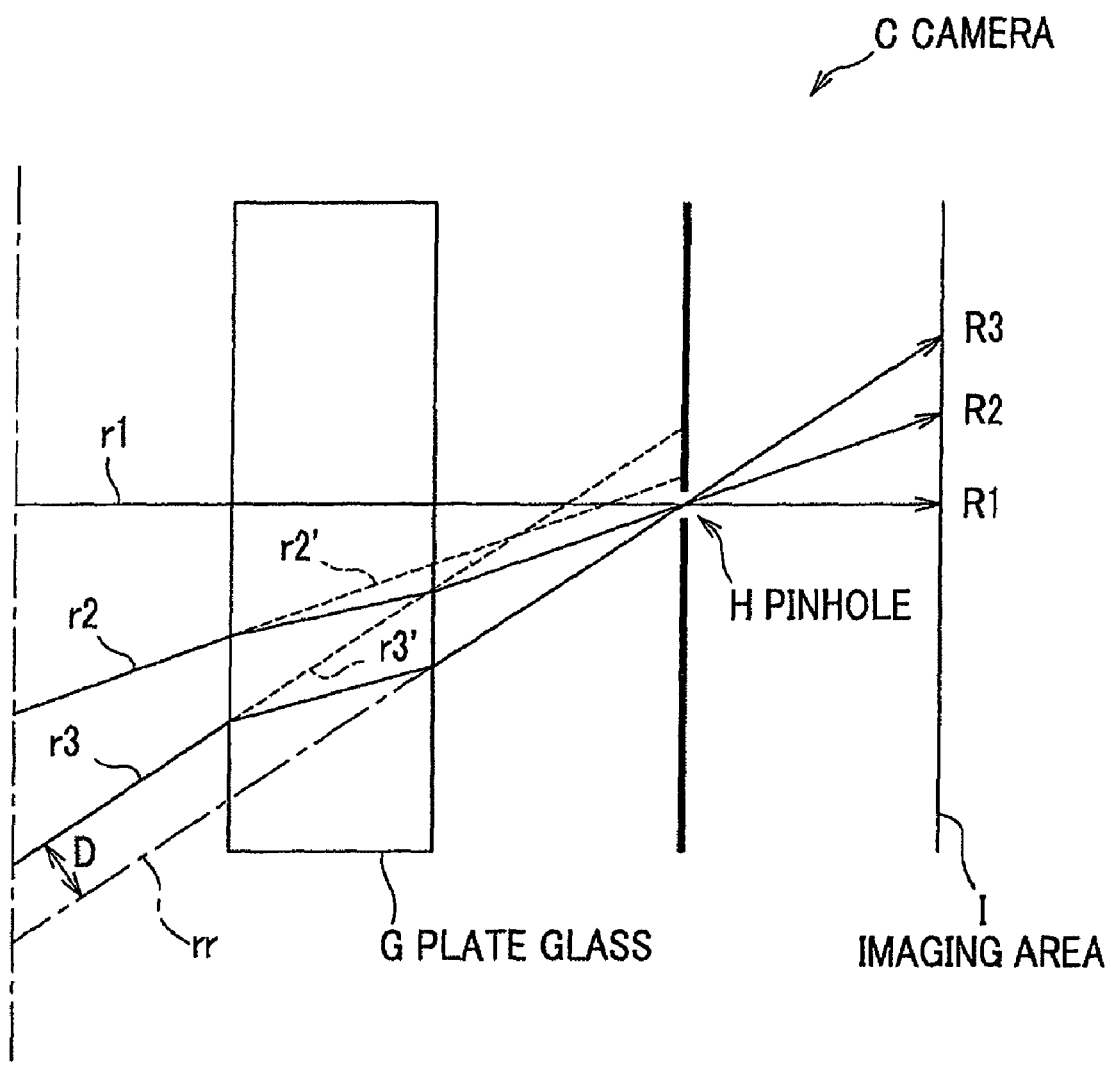
FIG. 9 is a diagrammatic view of a camera of a model having a lens system.

Next, a cause of distortions that occur in an image captured by a camera having a lens system in general will be explained with reference to FIG. 9. FIG. 9 is a schematic diagram of a model of a camera having a lens system. To simplify the explanation here, it is supposed that the lens system is a plate glass G and that a pinhole H is created. An incident ray of light r1 that vertically enters the plate glass G of the camera C is imaged on a pixel R1 on an imaging area I by passing through the pinhole H. Incident rays of light r2 and r3 that obliquely enter the plate glass G are imaged on pixels R2 and R3 on the imaging plane I by passing through the pinhole H after deflecting within the plate glass G.

However, r2' and r3' that are extensions of the incident rays of light r2 and r3 before passing through the plate glass G do not cross with the incident ray of light r1 at one point, so that it can be seen that this model is not the pinhole camera model. Due to that, the incident ray of light r3 that deviates from an incident ray of light rr supposed in the pinhole camera model by a distance D is imaged on the pixel R3 of the imaging plane I.

Thus, the pinhole characteristic is lost (falls into the non-pinhole characteristics) in the camera that captures an image by incident rays of light entering the lens system (the plate glass G here). The camera having the lens system will be called as a "non-pinhole camera" hereinafter.

[About Calibration Data]

Figure 10:
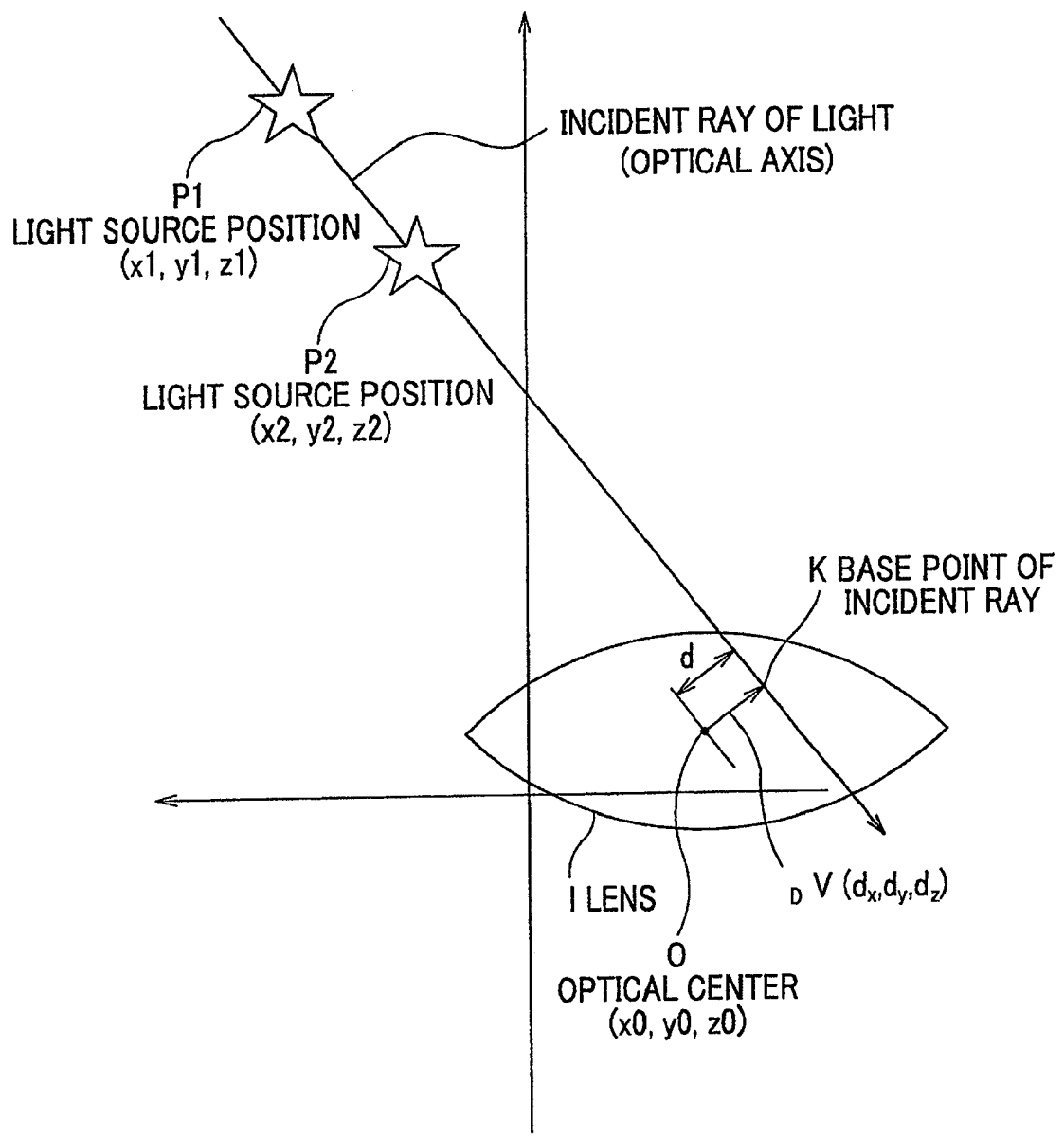
FIG. 10 is an explanatory diagram for explaining contents of calibration data.

Next, the calibration data obtained by digitizing the characteristics of the non-pinhole camera will be explained with reference to FIG. 10. FIG. 10 is a diagram for explaining contents of the calibration data. As shown in FIG. 10, a ray of light (optical axis) R incident on a lens 1 may be specified by two points. Here, when rays of light emitted from first and second light sources P1 and P2 are imaged on one and same imaging pixel (not shown), the incident ray of light (optical axis) R is specified as an incident ray of light corresponding to that imaging pixel.

Here, a point where a square sum of distances from all incident rays of light (optical axes) becomes least is defined as an optical center O and a point where a distance between the incident ray of light (optical axis) R corresponding to each imaging pixel and the optical center O becomes least is defined as an incidence base point K of the incident ray of light (optical axis) R.

That is, the optical center O (x0, y0, z0) is the position where a square sum of a distance d from the incident ray of light (optical axis) R (see Equation 2) specified by the light source positions P1 (x1, y1, z1) and P2 (x2, y2, z2) becomes least for all incident rays of light (optical axes) found by way of a least-square method.

$$d^2 = -(A^2/B) + C \qquad \text{Eq. 2}$$

Where, $A=(x2-x1)(x1-x0)+(y2-y1)(y1-y0)+(z2-z1)(z1-z0)$ $B=(x2-x1)^2+(y2-y1)^2+(z2-z1)^2$ $C=(x1-x0)^2+(y1-y0)^2+(z1-z0)^2$ This allows the characteristics of the non-pinhole camera to be digitized by utilizing data correlating the direction specified by the light source positions P1 and P2 with a displacement (represented by three-dimensional vectors VD (dx, dy, dz)) from the optical center O to the incidence base point K per pixel position.

It is noted that the calibration data is not limited to what described above. For instance, although the optical center O is defined as a reference position and a vector to a foot of a perpendicular extended from the optical center O to the incident ray of light is defined as the displacement VD in the example described above, the reference position is not limited to be the optical center and may be any point as long as the point is a fixed point having a certain relationship with the camera. Still more, the displacement VD is not limited to be the vector heading to the foot of the perpendicular extended from the reference position to the incident ray of light (optical axis) and may be a vector heading to one arbitrary point on the incident ray of light from the reference position.

[Calibration Information (Calibration Table) Generating Method]

Next, the method for generating the calibration table as calibration information correlating the calibration data obtained by digitizing the characteristics of the non-pinhole camera per imaging pixel will be explained with reference to FIG. 11. FIGS. 11A and 11B are conceptual drawings showing a principle of the method for generating the calibration table, wherein FIG. 11A shows a principle for measuring the calibration data by varying pan and tilt of the camera with respect to a specific incident ray of light and FIG. 11B shows a principle of measuring the calibration data by varying an incident ray of light (optical axis) with respect to a fixed camera.

As shown in FIG. 11A, the calibration table that correlates the calibration data per imaging pixel may be generated by moving the light source position in one direction of P1 and P2 (mono-axial movement) with respect to the camera C having the non-pinhole characteristics, by determining the incident ray of light (optical axis) R specified by the light source positions P1 and P2 and by specifying the direction of the incident ray of light R inputted per imaging pixel of the camera C by adjusting (bi-axial rotation) the pan and tilt of the camera C so that the rays of light emitted from the light source positions P1 and P2 are both inputted to the imaging pixel (measuring pixel) to be measured.

It is also possible to specify the direction of the incident ray of light (optical axis) R defined by the light source positions P1 and P2 and inputted to a measuring pixel by moving the light source positions P1 and P2 in X, Y and Z directions (tri-axial movement) so that the incident ray of light (optical axis) R emitted from the two points of the light source positions P1 and P2 enter the measuring pixel while fixing the camera C as shown in FIG. 11C.

It is then possible to generate the calibration table by correlating the direction of the incident ray of light (optical axis) R and the displacement to the incidence base point K from the optical center O per imaging pixel as the calibration data as explained in connection with FIG. 10 based on the incident ray of light (optical axis) R specified per each measured imaging pixel in FIG. 11A or 11B.

[Configuration of Position Detecting Apparatus]

Figure 1:
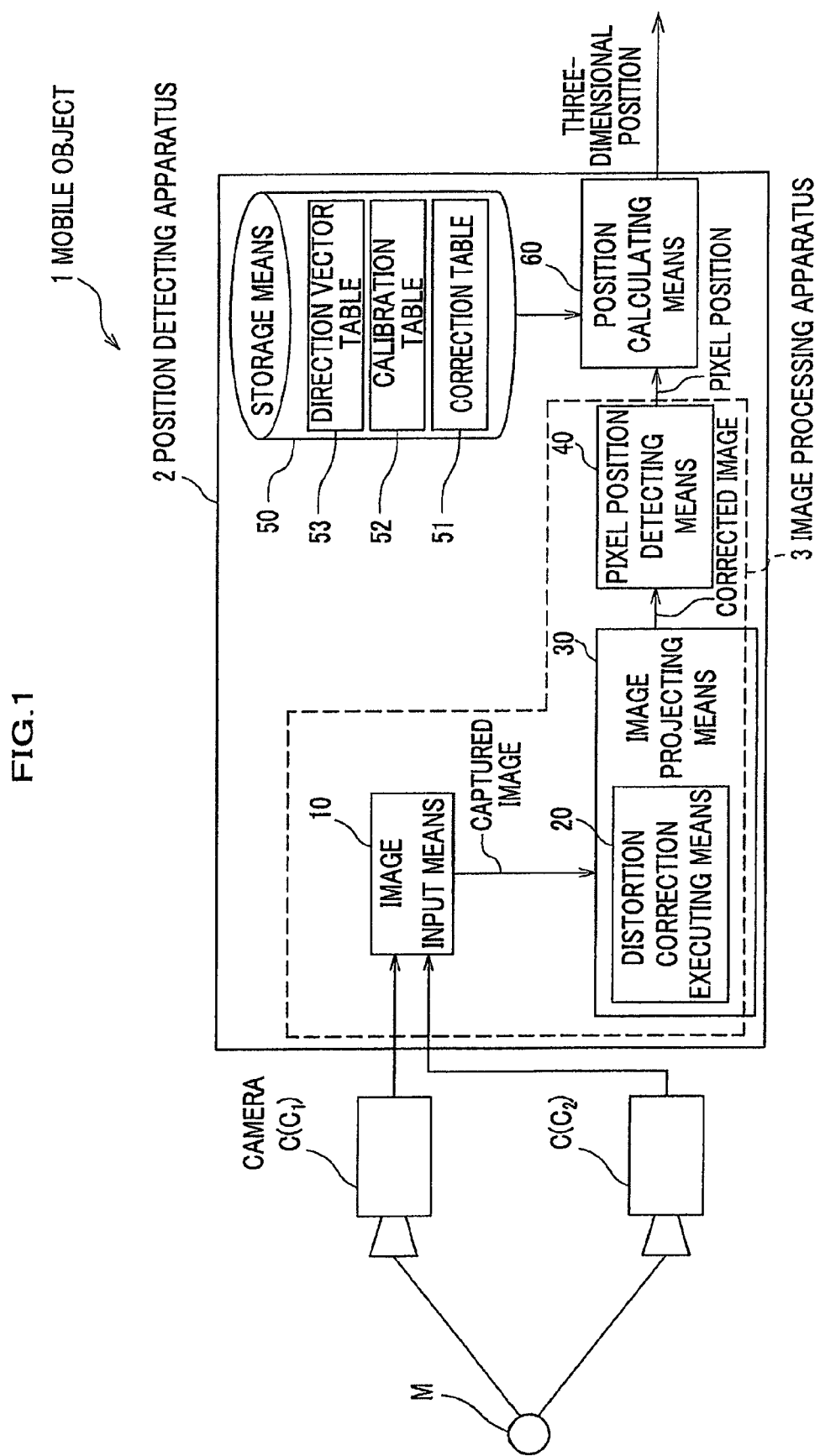
FIG. 1 is a block diagram showing an overall structure of a position detecting apparatus including an image processing apparatus according to an embodiment of the invention.

Next, the position detecting apparatus will be explained with reference to FIG. 1. FIG. 1 is a block diagram showing an overall structure of the position detecting apparatus containing the image processing apparatus of the embodiment of the invention. It is supposed that the position detecting apparatus 2 shown in FIG. 1 is mounted in a body (not shown) of a mobile object 1 together with the two cameras (non-pinhole cameras) C ($C_1$ and $C_2$) that are capable of imaging an object in wide-angle and are disposed on a straight line. The mobile object 1 is provided with a moving means not shown. The mobile object 1 is constructed as a mobile robot, an automobile and others. In the case of the mobile robot, the moving means is provided with a driving means capable of walking on two feet or of traveling by wheels.

The camera C includes a fish-eye lens for example. The two cameras C are disposed on the straight line to generate a stereo image. For example, optical centers of camera lenses of the respective cameras C are disposed on the straight line and the optical axes passing through the respective optical centers are disposed in parallel.

The position detecting apparatus 2 includes the image processing apparatus 3. The image processing apparatus 3 finds pixel position of an object (marker M) as information for use in detecting three-dimensional position of the object (marker M) out of an image of the object (marker M) captured by the camera C. Then, the position detecting apparatus 2 detects the three-dimensional position of the object (marker M) from the pixel position of the object (marker M) found by the image processing apparatus 3. Here, the position detecting apparatus 2 includes an image inputting means 10, an image projecting means 30, a pixel position detecting means 40, a storage means 50 and a position calculating means 60. Among them, the image processing apparatus 3 includes the image inputting means 10, the image projecting means 30 and the pixel position detecting means 40.

The maker M is a mark attached to specify a site whose position is to be detected and is a seal having a specific color or shape or a light emitting diode that emits an infrared ray and the like.

The image inputting means 10 inputs each image of the object (marker M) captured by the two cameras C. It is noted that when the captured images are inputted in a time-series manner as motion pictures, the respective images captured by the cameras $C_1$ and $C_2$ are inputted to the image inputting means 10 in synchronism. The image inputting means 10 is provided with a memory not shown for temporarily storing the respective images captured by the cameras $C_1$ and $C_2$ and the image projecting means 30 refers to the captured images stored in this memory.

The image projecting means 30 projects the images inputted from the respective cameras $C_1$ and $C_2$ on a cylindrical plane having an axial line disposed in parallel with the straight line on which the two cameras $C_1$ and $C_2$ are disposed. The image projecting means 30 projects the inputted images on the cylindrical plane while correcting distortions of the images. The image projecting means 30 corrects the distortions while projecting the images by using a correction table 51 described later.

The projection on the cylindrical plane (referred to as cylindrical projection hereinafter) will be explained herewith reference to FIGS. 2 through 5. FIGS. 2A and 2B are side views of projection planes, wherein FIG. 2A shows a projection plane of center projection and FIG. 2B shows a projection plane of the cylindrical projection, respectively.

In the center projection conventionally carried out, an object existing within a range of an angle θ from an optical axis of an optical center that corresponds to pinhole position is projected in a range of height d from a center point that corresponds to the optical center on a projection plane perpendicular to the optical axis of the optical center in a vertical (perpendicular) direction as shown in FIG. 2A. In this case, d is an image height and is represented by the following Equation 3, where k denotes a constant and is a distance from a pinhole to the projection plane, i.e., an imaginary focal distance.

$$d = k\tan\theta \qquad \text{Eq. 3}$$

According to Equation 3, when the incident angle θ is doubled, the image height d increases twice or more on the projection plane. Still more, it is unable to define the image height d when the incident angle θ is 90 degrees and the height becomes minus when the incident angle exceeds 90 degrees. Accordingly, it is unable to form an image of light entering with an angle exceeding 90 degrees.

Meanwhile, an object existing within a range of angle θ from the optical axis of the optical center is projected in a range of length d along a projection plane from a center point that corresponds to pinhole position on the projection plane formed by the cylindrical plane in the vertical (perpendicular) direction as shown in FIG. 2B. Here, the cylinder has an axial line in parallel with the straight line connecting principal points of the camera lenses of the two cameras C for example. Then, the axial line of the cylinder is disposed at the optical center and a radius of the cylinder indicates an imaginary focal distance of the pinhole for example. In this case, d is expressed by Equation 4 as follows;

$$d = k\theta \qquad \text{Eq. 4}$$

Figure 3:
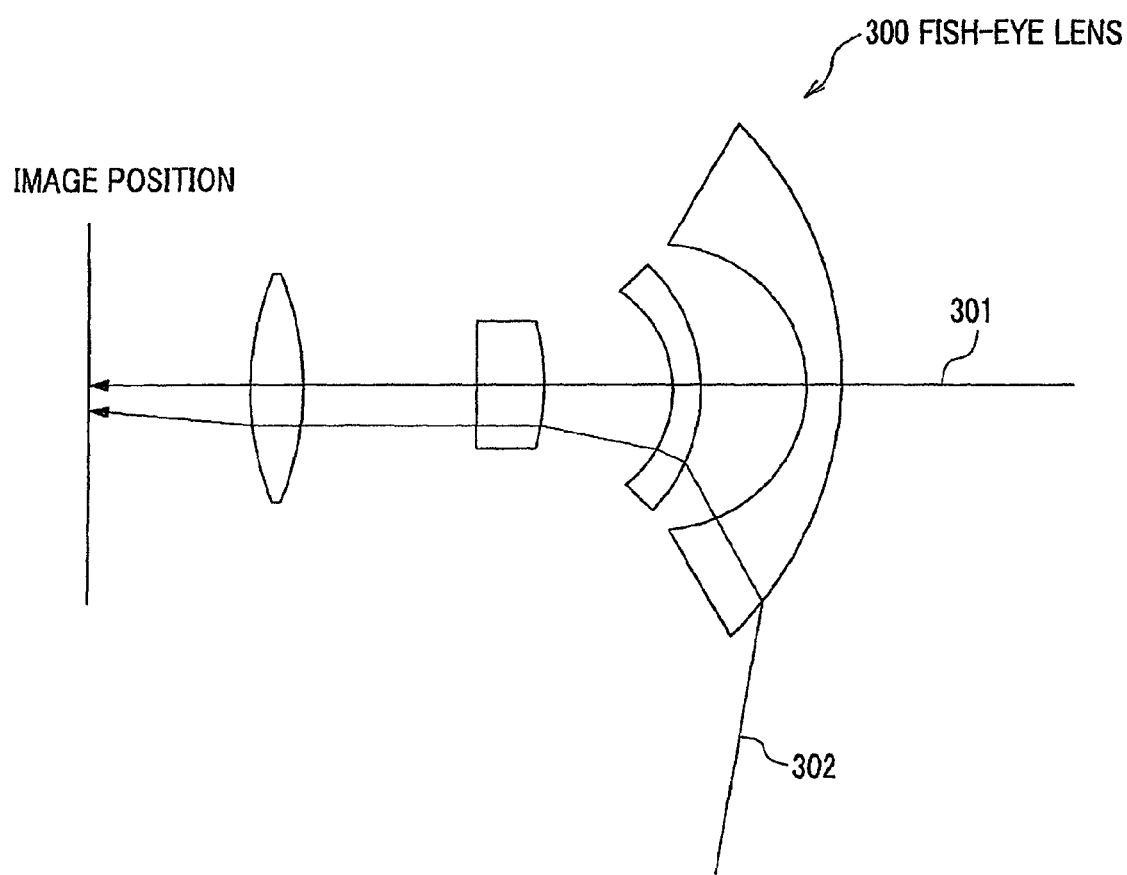
FIG. 3 is an explanatory diagram showing one exemplary fish-eye lens capable of imaging incoming light whose angle range exceeds 180 degrees.

Where, k is a constant and is a distance from the optical center to the projection plane, i.e., a focal distance. According to Equation 4, when the incident angle θ is doubled, the image height d is also doubled on a plain projection plane obtained by opening the cylindrical plane in the case of the cylindrical projection. The image height d may be defined even when the incident angle θ is 90 degrees or more. Accordingly, it is possible to use a fish-eye lens 300 as shown in FIG. 3 capable of imaging incoming light whose angle range exceeds 180 degrees, e.g., 200 degrees, for the camera C. In this case, the fish-eye lens 300 can form not only an image of light (optical axis 301) entering from a front side of the fish-eye lens 300 (from a right side in FIG. 3) but also an image of light (optical axis 302) entering from behind the position of the fish-eye lens 300 (from the under left side in FIG. 3).

Equation 4 described above is the same with the equation representing the image height when equidistance projection is adopted to the projection method of the fish-eye lens. A relationship between an azimuth of the incident ray of light (optical axis) and the position (u, v) on the screen of this case is represented by Equations 5A and 5B as follows. Where, α denotes a horizontal azimuth (horizontal direction) of the incident ray of light and γ denotes a vertical azimuth (perpendicular direction). Note that k1 and k2 are predetermined constants:

$$u = k1\tan\alpha \qquad \text{Eq. 5a}$$

$$v = k2\gamma \qquad \text{Eq. 5b}$$

Figure 4:
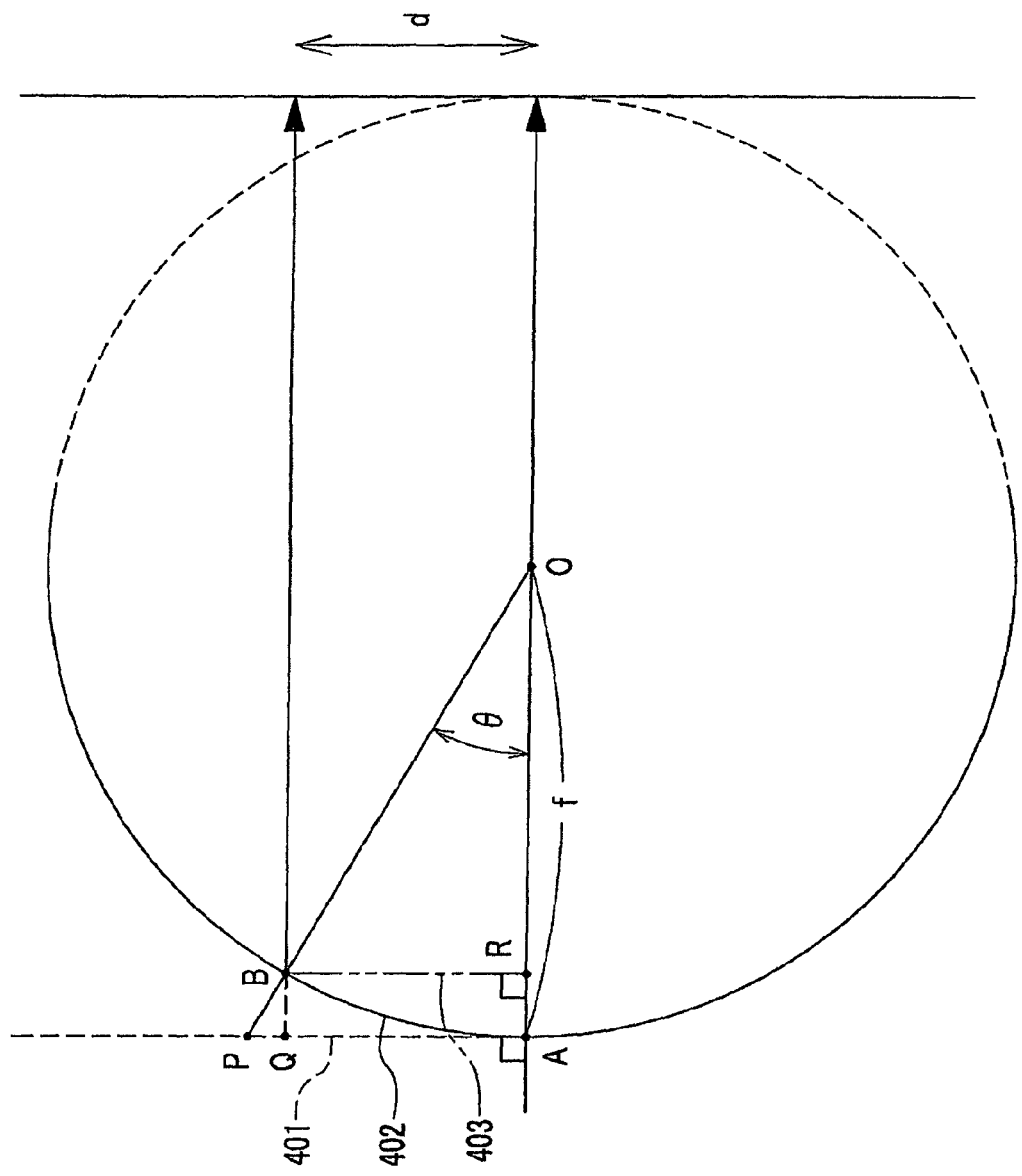
FIG. 4 is an explanatory diagram showing a projecting method performed by an image projecting means shown in FIG. 1.

While the relational expressions of Equations 5A and 5B represent the relationship on the plain projection plane obtained by opening the cylindrical plane on which the input image is projected, it is also possible to find the relationship between the azimuth of the incident ray of light (optical axis) and the position (u, v) on the screen without opening the cylindrical plane on which the input image is projected as shown in FIG. 4. FIG. 4 is an explanatory diagram showing a projection method conducted by the image projecting means shown in FIG. 1. FIG. 4 is a side view of the projection plane similarly to FIG. 2. In FIG. 4, the cylindrical plane is formed of a substantially semi-cylinder (200 degrees of center angle in section) whose axial center is O and whose radius is f (focal distance). The radius OA coincides with the optical axial direction of the optical center and a half-straight line indicated by a broken line from a point A represents an imaginary plain projection plane attained by the center projection. An angle formed between the radius OA and a radius OB is θ.

When an object is projected on the imaginary plain projection plane within a range of the angle θ, its image height is represented by a length AP 401. Meanwhile, when the object is projected on the cylindrical projection plane within the range of the angle θ, its image is projected on an arc AB 402. Accordingly, an image height of the image projected on the cylindrical plane is represented by a length BR 403 when the image is seen from the right side of the optical center on the optical axial direction. It is noted that the point R is a foot of a perpendicular brought down from the point B. The image height 403 projected on the cylindrical plane is indicated again by d in FIG. 4.

When a case when the image height projected on the imaginary plain projection plane becomes d for example is supposed in FIG. 4, the image height on the imaginary plain projection plane is represented by AQ that is shorter than AP

401. The image height represented by AQ on the imaginary plain projection plane is formed by rays of light in an angle range smaller than the angle θ. That is, as compared to the image whose image height formed on the imaginary plain projection plane is d, an information amount of the image formed by being projected on the cylindrical plane and having the image height d increases in a high-angle part in the vertical (perpendicular) direction by an amount corresponding to an imaginary plain projection plane PQ. This will be explained from another aspect. Although the information amount is compressed in the center part (low-angle part) in the vertical (perpendicular) direction when the image is projected on the cylindrical plane as compared to the case when the image is projected on the plain projection plane in the same manner, the information amount increases in the peripheral part (high-angle part) and the information amount is equalized as a whole in the vertical (perpendicular) direction. This will be explained with reference to FIGS. 5A through 5C.

FIG. 5A is an explanatory image of a captured image before being projected, FIG. 5B is an explanatory image after being projected by way of the center projection and FIG. 5C is an explanatory image after being projected by way of the cylindrical projection, respectively. As compared with the captured image shown in FIG. 5A, changes of height and depth of a table 501 and a box 502 disposed near the center are relatively small in the case of the center projection shown in FIG. 5B. It is a natural image when viewed by human eyes as compared to the original image. However, as compared with the captured image shown in FIG. 5A, the depth of the table 501 disposed near the center is small and the height of the box 502 is low in the case of the cylindrical projection shown in FIG. 5C. That is, it is unnatural when viewed by the human eyes as compared to the original image. This happens because the information amount is equalized as a whole in the vertical direction even though the information amount is compressed at the center part in the vertical direction as described above when the image is projected on the cylindrical plane as compared to the case when the image is projected on the plain plane in the same manner. It contributes in the reduction of a memory amount to be used and a calculation time in detecting the position of the object. It is noted that although one each image has been shown in FIGS. 5A through 5C, they are images captured by one camera C and actually the position of the object is detected by two images.

Equations 6A and 6B show a relationship between the direction of the incident ray of light (optical axis) and the position (u, v) on the screen in the case when the cylindrical plane is not opened after the projecting on the cylindrical plane. Where, α denotes the transverse (horizontal) direction of the incident ray of light (optical axis) and γ denotes the vertical (perpendicular) direction:

$$u = k1 \tan\alpha \quad \text{Eq. 6a}$$

$$v = k2 \sin\gamma \quad \text{Eq. 6b}$$

Because the same effect is brought about in the both cases of using the relational expressions of Equations 5A and 5B and of using the relational expressions of Equations 6A and 6B when the image is projected on the cylindrical plane, the relational expressions of Equation 5A and 5B will be used hereinafter.

Returning now to FIG. 1, the explanation of the position detecting apparatus 2 will be continued. The pixel position detecting means 40 detects pixel position corresponding to the object in the image projected on the cylindrical plane by the image projecting means 30. Here, gravity position of an area captured as the marker M on the captured image is defined as the pixel position corresponding to the object. The pixel position of each captured image detected here is inputted to the position calculating means 60. It is noted that the pixel position detecting means 40 may be arranged so that it detects the pixel position corresponding to the object by matching with a block having a specific size of the image captured by the camera C.

The storage means 50 is a storage device such as a memory and a hard disk used in storing database necessary for the position detecting apparatus 2 and images under processing and as a work area. The storage means 50 stores a correction table 51 used in projecting the image captured by the camera C on the cylindrical plane and in correcting distortions, a calibration table (correction information) 52 used in correcting the optical center O of the camera and the directional vector table 53 used in calculating a distance to the object.

As shown in FIG. 12A, the correction table 51 stores each pixel (x, y) of an input image that corresponds to each pixel of a projected image and constants (K1, K2, K3, K4) calculated in advance to be applied to a pixel value of each pixel (x, y). Because this correction table 51 is created in advance by using the calibration table 52 and the directional vector table 53, this will be explained later again after explaining the calibration table 52 and the directional vector table 53.

The calibration table 52 is a table in which calibration data are correlated per each imaging pixel of the cameras $C_1$ and $C_2$. It is noted that the calibration data per each imaging pixel, i.e., the contents of the calibration table 52, contain the direction of the incident ray of light (optical axis) entering each imaging pixel and the displacement VD from the reference position (optical center O) to the incident ray of light (optical axis) as explained with reference to FIG. 10. Although one calibration table 52 is shown in FIG. 1, actually there are two calibration tables.

As shown in FIG. 13A, the calibration table (calibration information) 52 stores the displacement VD (dx, dy, dz) from the optical center O and the directions (angles) α and γ as information for specifying the incident ray of light (optical axis) entering the imaging pixel by correlating with a combination of x and y coordinates of each pixel of the captured image (input image). It is noted that although the calibration information is explained as the calibration table correlating the displacement VD and the directions (angles) α and γ here, the calibration information may be expressed by predetermined functions and conversion equations.

As shown in FIG. 12B, the directional vector table 53 stores coordinates (u', v') on a corrected image (captured image) and angles αR, αL and γ that specify the direction of incoming light at that pixel position while correlating them.

The angles αR, αL and γ signify respectively as follows:

αR: an angle in a horizontal direction of a vector heading from right camera position (0, 0, 0) that is a corrected optical center of the camera $C_1$ (supposed to be the right camera) to object position (Px, Py, Pz) from the optical axis (x-axis) of the camera;

γ: an angle in the vertical direction of a vector from a starting point (0, Py, 0) to an ending point, i.e., the object position (Px, Py, Pz), from a x,y-plane; and αL: an angle in the horizontal direction of a vector heading from left camera position (0, d, 0) that is a corrected optical center of the camera $C_2$ (supposed to be the left camera) to the object position (Px, Py, Pz) from the optical axis of the camera $C_2$.

Figure 6:
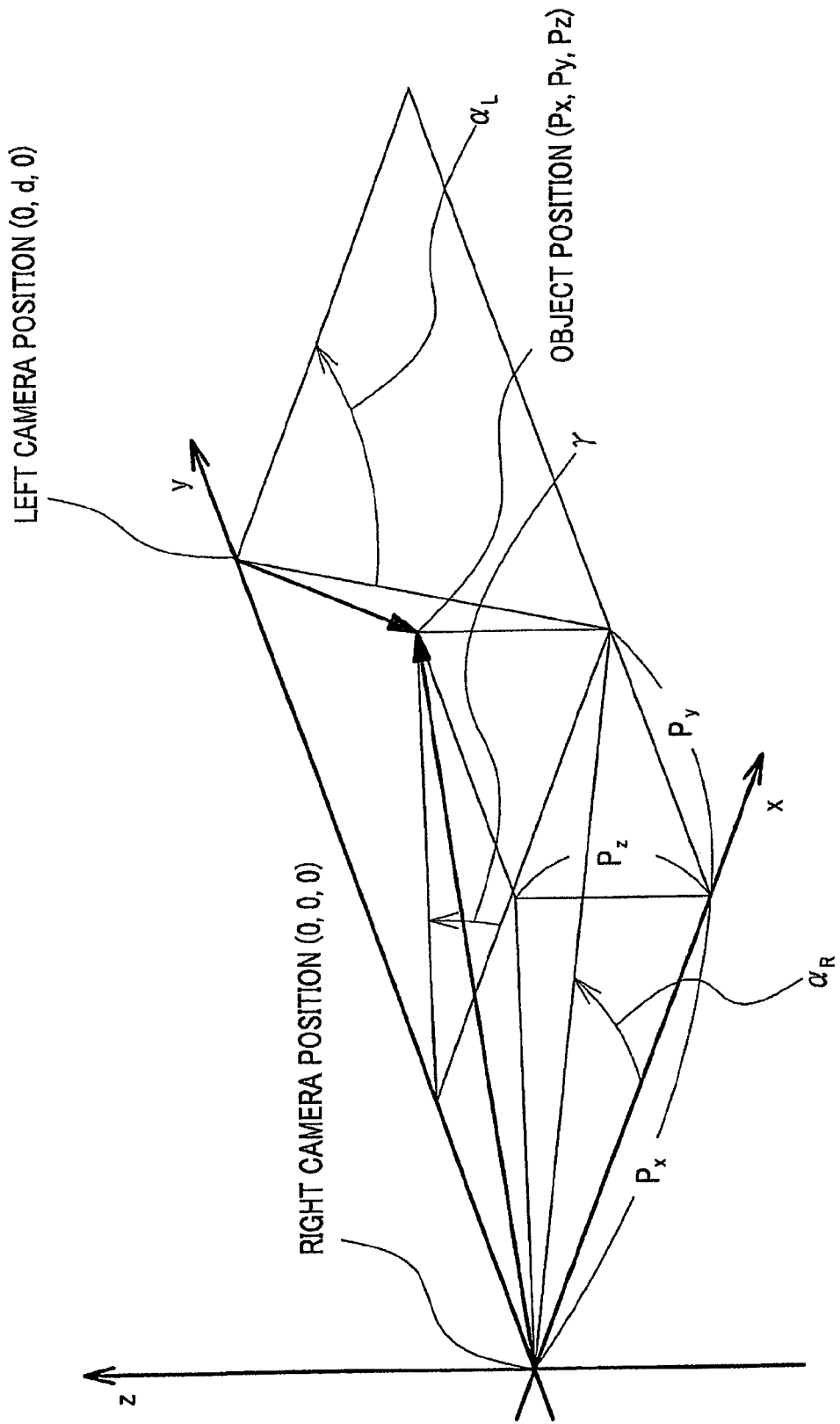
FIG. 6 is an explanatory diagram for explaining one exemplary method for calculating three-dimensional position of an object.

Where, $-\pi/2 < \alpha R < \pi/2$, $\pi/2 < \alpha L < \pi/2$ and $-\pi/2 < \gamma < \pi/2$. The angles αR, αL and γ will be denoted as angles (α, γ) altogether hereinafter. Calculation formulas for obtaining the angles (α, γ) are represented by Equations 7 and 8 based on Equations 5A and 5B described above, as follows. In Equations 7 and 8, the either camera position shown in FIG. 6 is generalized as (cu, Ck), the position on the screen is defined as (u, v) and predetermined constants are defined as ku and kv.

$$\alpha = \tan^{-1}((u-cu)/ku) \qquad \text{Eq. 7}$$

$$\gamma = (v-ck)/kv \qquad \text{Eq. 8}$$

It is possible to correct distortions of a captured image (input image) in a corrected image (projected image) by creating the correction table 51 by using the calibration table 52 and the directional vector table 53. An outline of one exemplary method for creating the correction table 51 will be explained. At first, angles (α, γ) of an optical axis of an incident ray to be inputted to a pixel (u, v) after projection is found from the directional vector table 53 (see FIG. 12B). Then, coordinates (x, y) of the pixel (imaging pixel) of the input image (captured image) corresponding to the angles (α, γ) found as described above are found from the two calibration tables 52 corresponding respectively to the two right and left cameras C. The coordinates (x, y) of the imaging pixel found in correspondence to the pixel (u, v) after the projection are then recorded in the correction table 51. The pixel (u, v) after the projection is positioned between pixels in the captured image, so that a pixel value, e.g., luminance, of the pixel (u, v) after the projection is set as a value obtained by linearly complementing pixel values of four surrounding imaging pixels of 2×2. For instance, a constant to be multiplied with each pixel value is set by setting coordinate values of the upper left imaging pixel among the four (2×2) pixels as the coordinates (x, y) of the imaging pixel to be recorded in the correction table 51, as follows:

Constant to be multiplied with a pixel value ($V_1$) of an upper left imaging pixel: $K_1$ Constant to be multiplied with a pixel value ($V_2$) of an upper right imaging pixel: $K_2$ Constant to be multiplied with a pixel value ($V_3$) of a lower left imaging pixel: $K_3$ Constant to be multiplied with a pixel value ($V_4$) of a lower right imaging pixel: $K_4$ In this case, a pixel value V0 of the pixel (u, v) after the projection is expressed by Equation 9 as follows:

$$V_0 = K_1 \times V_1 + K_2 \times V_2 + K_3 \times V_3 + K_4 \times V_4 \qquad \text{Eq. 9}$$

The correction table 51 records the constants ($K_1$ through $K_4$) to be multiplied with the respective pixel values together with the coordinates (x, y) of the imaging pixel. The constants ($K_1$ through $K_4$) to be multiplied with the respective pixel values are found not by the center projection but by utilizing the relational formula of the cylindrical projection represented by Equations 5A and 5B described above. Thereby, the image projecting means 30 can project the image on the cylindrical plane and can correct the distortions of the input image at the same time by acquiring the coordinates and the pixel value of the imaging pixel from the image (captured image) inputted from the respective cameras $C_1$ and $C_2$ and by calculating the pixel value of the pixel after the projection by making reference to the correction table 51 and by using the relationship of Equation 9 described above. It is noted that the relational expressions of the cylindrical projection shown in Equations 6a and 6b may be also utilized.

Returning now again to FIG. 1, the explanation of the position detecting apparatus 2 will be continued.

The position calculating means 60 calculates the position (three-dimensional position) of the object (marker M) based on the calibration data (direction of the incident ray of light and the displacement) in the calibration table 52 and the directional vector table 53 corresponding to the pixel position of each captured image detected by the pixel position detecting means 40.

While the structure of the position detecting apparatus 2 containing the image processing apparatus 3 has been explained above, the invention is not limited to that. For example, although the embodiment has been explained such that the image projecting means 30 projects images and corrects distortions at the same time, it is also possible to arrange such that the distortion correction executing means 20 is provided separately and so that the distortion correction executing means 20 corrects the distortions of the input image and the image projecting means 30 projects the image whose distortions has been corrected in advance on the cylindrical plane. In this case, the distortion correction executing means 20 corrects the distortions caused by the camera C so that level of the distortions is reduced by moving the pixels of the input image. The distortion correction executing means 20 receives data of right and left captured images from the image inputting means 10 and corrects distortions of the captured images by making reference to the distortion correction table shown in FIG. 13B for example. The distortion correction executing means 20 generates a right corrected image from the image captured by the right camera $C_2$ and generates a left corrected image from the image captured by the left camera $C_1$. As shown in FIG. 13B, the distortion correction table 51 correlates and stores coordinates (x, y) on the images captured by the cameras $C_1$ and $C_2$ and pixels (du, dv) at that coordinates to be displaced. The distortion correction tables are prepared for the cameras $C_1$ and $C_2$, respectively. It is noted that the distortion correction tables may be used in common when optical specifications of the respective cameras $C_1$ and $C_2$ are the same and their production precision is high.

Here, one exemplary method for generating the distortion correction table shown in FIG. 13B will be briefly explained. When a grid checker-wise pattern drawn in a plain plane is imaged squarely by the cameras $C_1$ and $C_2$, there is provided an image having a barrel-type distortion on an outer peripheral edge of the checker-wise pattern (image before correction). It is then possible to obtain an image (corrected image) whose distortion has been corrected by moving grid points of the whole screen so as to match with a number of vertical and horizontal pixels of the grids at the center of the screen where the distortion is negligible from the image before the correction. Then, a table is made by correlating movements (relative coordinates) of the grid points with the pixel positions of the image before the correction. Linear complementation is performed on each pixel between the grid points. The distortion correction table is thus generated. Although the distortion correction table allows the image to be accurately corrected at the distance where the checker-wise pattern is imaged in generating the table, the image cannot be completely accurately corrected when the imaging distance is different. However, the epi-polar line of the right and left is substantially straight and hence there is no problem even if corresponding points of the pixels are sought on the straight line during stereo matching. Then, the distortion correction executing means 20 corrects the distortion by acquiring the movement of each pixel position from the distortion correction table and by moving the pixels of the captured image. It is noted that the method of correcting distortions by the distortion correction executing means 20 is not limited to that of using the distortion correction table shown in FIG. 13B and other known methods may be used. For example, functions for finding distortions by approximation may be used instead of the distortion correction table.

Still more, although the position of the object has been detected based on the images captured by the two cameras C in the embodiment described above, it is also possible to detect the position by using three or more cameras. For example, it is possible to detect the position of the object more accurately by disposing nine cameras in matrix, i.e., 3×3, by detecting the position between the reference camera disposed at the center and the other eight cameras and by averaging the position taken by the eight cameras.

It is noted that the respective means of the image processing apparatus, i.e., the image inputting means 10, the image projecting means 30 and the pixel position detecting means 40 are realized by executing a program (image processing program) on a conventional computer and by operating a computing unit and storage unit (including the storage means 50) within the computer. It is possible to distribute this program via a communication line or to distribute by writing into a recording medium such as a CD-ROM. The computer to which this program is installed brings about the same effect with the image processing apparatus 3 when a CPU thereof develops this program stored in a ROM and others to a RAM. Similarly to that, the respective means of the position detecting apparatus, i.e., the image inputting means 10, the image projecting means 30, the pixel position detecting means 40 and the position calculating means 60 may be realized by executing a program (position detecting program) on the conventional computer and by operating the computing unit and the storage unit (including the storage means 50) within the computer.

[Operation of Position Detecting Apparatus]

Figure 7:
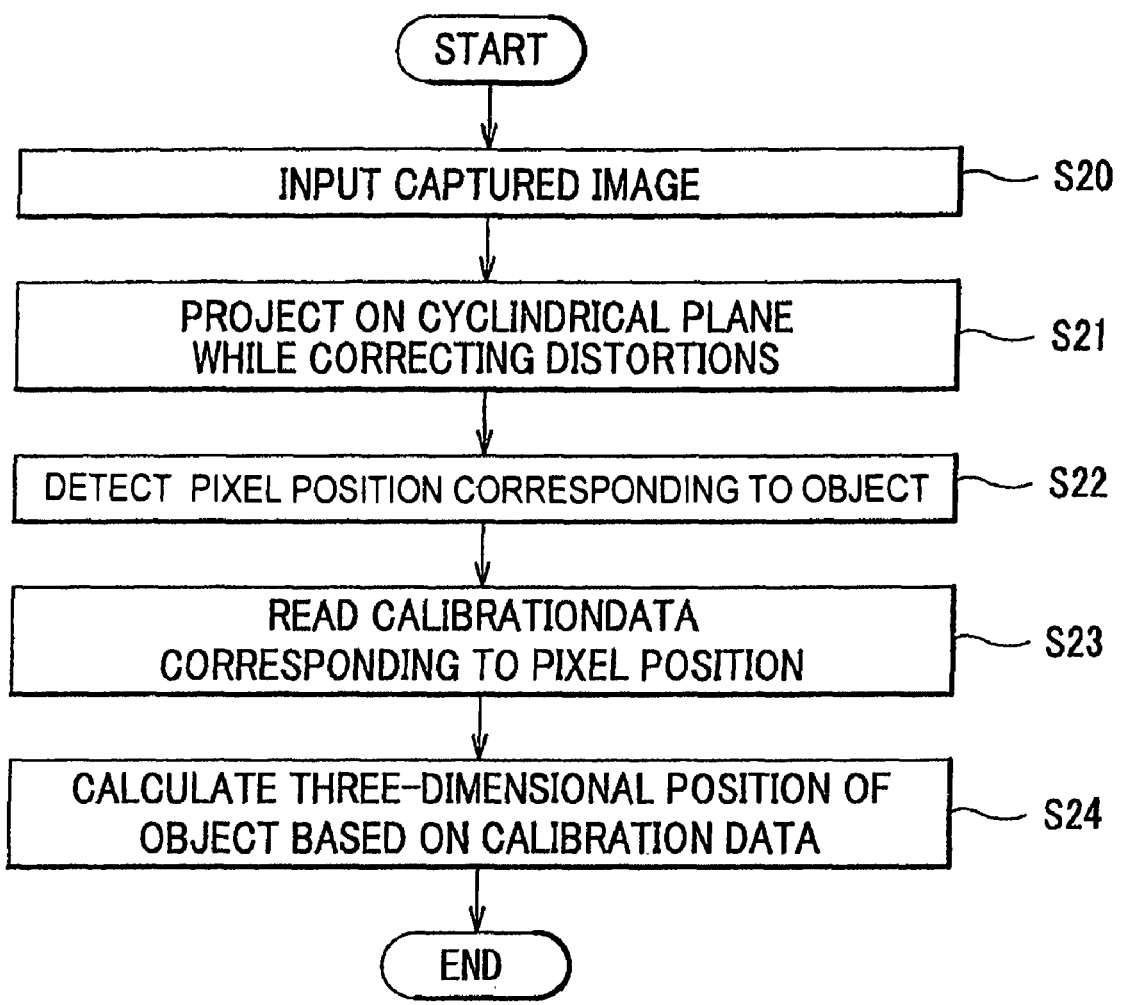
FIG. 7 is a flowchart showing operations of the position detecting apparatus shown in FIG. 1.

Next, operations of the position detecting apparatus 2 will be explained with reference to FIG. 7 (and appropriately to FIG. 1). FIG. 7 is a flowchart showing the operations of the position detecting apparatus 2.

At first, the position detecting apparatus 2 inputs images captured by the two cameras $C_1$ and $C_2$ by the image inputting means 10 in Step S20 (image inputting step). Then, the position detecting apparatus 2 projects the captured images on the cylindrical plane while correcting distortions by the image projecting means 30 by making reference to the correction table 51 in Step S21 (image projecting step). Next, the position detecting apparatus 2 detects pixel position corresponding to the object (marker M) in each image projected on the cylindrical plane by the image projecting means 30 in Step S22 (pixel position detecting step).

The position detecting apparatus 2 reads the calibration data corresponding to the pixel position of the object (marker M) by the position calculating means 60 from the calibration table 52 corresponding to the cameras $C_1$ and $C_2$ in Step S23 and calculates three-dimensional position of the object (marker M) based on the calibration data of each pixel position and the directional vector table 53 in Step S24.

Here, the method for calculating the three-dimensional position of the object carried out in Step S24 will be explained more specifically with reference again to FIG. 6 (and appropriately to FIG. 1).

In FIG. 6, a corrected optical center (right camera position) O1 obtained by correcting the optical center of the camera $C_1$ based on a displacement (obtained from the calibration table 52 for the right camera) corresponding to the pixel position of the marker M in the captured image of the camera $C_1$ (right camera) will be defined as (0, 0, 0). A corrected optical center (left camera position) O2 obtained by correcting the optical center of the camera $C_2$ based on a displacement (obtained from the calibration table 52 for the left camera) corresponding to the pixel position of the marker M in the captured image of the camera $C_2$ (left camera) will be defined as (0, d, 0). That is, the right camera is disposed at the origin of the coordinates and the left camera is disposed at the position separated from the origin of the coordinates by d on the y-axis.

A direction of an incident ray of light (optical axis) corresponding to the pixel position of the marker M in the captured image of the camera $C_1$ (right camera) will be represented by a horizontal angle αR and a vertical angle γR (obtained from the calibration table 52 for the right camera) and a direction of the incident ray of light (optical axis) corresponding to the pixel position of the marker M in the captured image of the camera $C_2$ (left camera) will be represented by a horizontal angle αL and a vertical angle γL (obtained from the calibration table 52 for the left camera). In this case, the object position (Px, Py, Pz) may be calculated by Equations 10 through 12. It is noted that in Equation 12, γ is an angle stored in correlation with the angles αR and αL in the directional vector table 53 (see FIG. 122B).

$$Px = d/(\tan\alpha R - \tan\alpha L) \qquad \text{Eq. 10}$$

$$Py = Px \tan\alpha R \qquad \text{Eq. 11}$$

$$Pz = Px \tan\gamma \qquad \text{Eq. 12}$$

Thus, according to the present embodiment, the image processing apparatus 3 can reduce the memory amount to be used and the processing time in processing images captured in a wide-angle by way of the stereo vision.

Although the preferred embodiment of the invention has been explained above, the invention is not limited to the embodiment described above. For example, although the position detecting apparatus 2 detects the three-dimensional position of the object (marker M) based on the calibration table 52 and the directional vector table 53, the directional vector table 53 is not essential.

Figure 14:
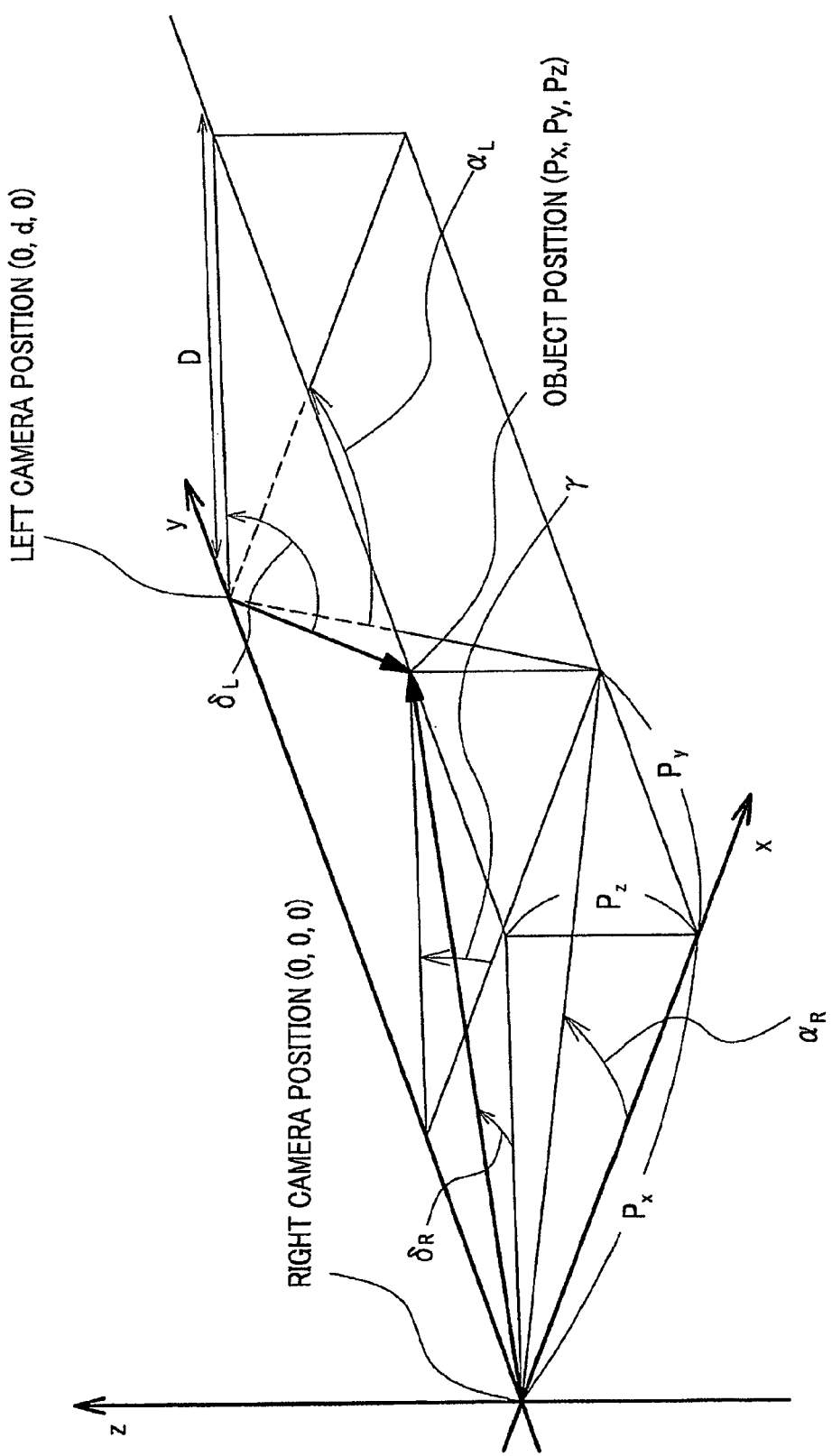
FIG. 14 is an explanatory diagram for explaining another exemplary method for calculating the three-dimensional position of the object.

Still more, although the methods for creating the directional vector table 53 and the correction table 51 and for calculating the three-dimensional position of the object has been explained with reference to FIG. 6 in the embodiment described above, the invention is not limited to that and an angular relationship shown in FIG. 14 may be also used for example. FIG. 14 is different from FIG. 6 in that angles δR and δL and a distance L are added.

As shown in FIG. 14, δR and δL and the distance D represent respectively:

δR: an angle formed between a vector whose starting point is the right camera position (0, 0, 0) and whose ending point is (0, 0, Pz) and a vector whose starting point is the right camera position (0, 0, 0) and whose ending point is the object position (Px, Py, Pz);

δL: an angle formed between a vector whose starting point is the left camera position (0, d, 0) and whose ending point is (0, d, Pz) and a vector whose starting point is the left camera position (0, d, 0) and whose ending point is the object position (Px, Py, Pz); and D: a distance between the left camera position (0, d, 0) and (0, d, Pz).

Where, $-\pi < \delta R < \pi, -\pi < \delta L < \pi$.

In this case, it is possible to calculate the object position (Px, Py, Pz) by Equations 13 through 16 as follows:

$$Px = D\cos\gamma \qquad \text{Eq. 13}$$

$$Py = D\tan\delta_R \qquad \text{Eq. 14}$$

$$Pz = D\sin\gamma \qquad \text{Eq. 15}$$

$$\text{Where, } D = d/(\tan\delta_R \tan\delta_L) \qquad \text{Eq. 16}$$

This method allows the object position to be found accurately even when the fish-eye lens capable of imaging an angle range of incoming light exceeding 180 degrees is used. It is noted that $\gamma$ is the angle stored in connection with the angles $\delta R$ and $\delta L$ in the directional vector table 53 (see FIG. 12B) in Equations 13 and 15. In this case, $\delta R$ and $\delta L$ and $\gamma$ are found in advance instead of the angle $(\alpha, \gamma)$ in the directional vector table 53 described above. The following Equations 17 and 18 may be used instead of Equation 7 and 8 described above as calculating formulas in this case. It is noted that $\alpha$ at this may be represented by Equation 19:

$$\delta = \tan^{-1}((u-cu)/ku) \qquad \text{Eq. 17}$$

$$\gamma = (v-ck)/kv \qquad \text{Eq. 18}$$

$$\alpha = \tan^{-1}[(u-cu)/(ku\cos\{(v-ck)/kv\})] \qquad \text{Eq. 19}$$

It is also noted that the projection method of the fish-eye lens has been explained as equidistance projection in the present embodiment, the invention is not limited to that and may adopt stereoscopic projection, equi-solid angle projection and orthogonal projection as indicated respectively by Equations 20 through 22. In these projection methods, images projected on a plain plane may be projected on the cylindrical plane afterward. It is noted that in Equations 20 through 22, d denotes an image height, $\theta$ denotes a half-value angle on the side of the object and k denotes a focal distance of the camera, respectively.

$$d = 2k\tan(\theta/2) \qquad \text{Eq. 20}$$

$$d = 2k\sin(\theta/2) \qquad \text{Eq. 21}$$

$$d = k\sin\theta \qquad \text{Eq. 22}$$

When the orthogonal projection is adopted as indicated by Equation 22 for example, Equations 23 and 24 may be used instead of Equations 7 and 8 described above as calculating formulas for obtaining the angle $(\alpha, \gamma)$ in the directional vector table 53.

$$\alpha = \tan^{-1}((u-cu)/ku) \qquad \text{Eq. 23}$$

$$\gamma = \sin^{-1}((v-ck)/kv) \qquad \text{Eq. 24}$$

Still more, although the present embodiment has been explained while supposing that the position detecting apparatus 2 is mounted in the mobile object 1, the invention is not limited to that. The position detecting apparatus 2 may be mounted in an industrial robot that does not step away from fixed position or may be a stand-alone system.

It is noted that although the mode described above is the best mode for carrying out the invention, it is not intended to limit the invention to such mode. Accordingly, the mode for carrying out the invention may be variously modified within a scope in which the subject matter of the invention is not changed.

I claimed:

1. An image processing apparatus for finding pixel positions of an object and detecting a position of the object from images captured by two cameras that are capable of imaging the object in wide-angle and are disposed on a straight line, comprising:
    an image input means for inputting the images captured by the two cameras;
    an image projecting means for projecting the images inputted from the respective cameras on a cylindrical plane having an axial line disposed in parallel with the straight line on which the respective cameras are disposed; and
    a pixel position detecting means for detecting the pixel positions corresponding to the object in the image projected on the cylindrical plane; and
    a position detecting means for obtaining a direction of an incident ray of light from the object and its displacement corresponding to a respective pixel position.

2. The image processing apparatus according to claim 1, wherein the image projecting means projects the inputted images on the cylindrical plane while correcting distortions of the images.

3. A position detecting apparatus, comprising:
    the image processing apparatus described in claim 1 and
    a storage means for storing calibration data correlating a direction of an incident ray of light and a displacement from a reference position to the incident ray of light per camera;
    wherein the position detecting apparatus obtains the direction of the incident ray of light and its displacement corresponding to the pixel position from the calibration information based on the pixel position correlated by the image processing apparatus to each image of the object captured by each camera to calculate the position of the object by using this direction of the incident ray of light and its displacement.

4. A mobile object, comprising:
    a body having the position detecting apparatus described in claim 3 and two cameras capable of imaging in wide-angle, disposed on a straight line and output captured images of the object to the position detecting apparatus; and
    a moving means for moving the body.

5. An image processing method of an image processing apparatus for finding pixel positions of an object and detecting a position of the object from images captured by two cameras that are capable of imaging the object in wide-angle and are disposed on a straight line, comprising steps of:
    inputting the images captured by the two cameras;
    projecting the images inputted from the respective cameras on a cylindrical plane having an axial line disposed in parallel with the straight line on which the respective cameras are disposed;
    detecting the pixel positions corresponding to the object in the image projected on the cylindrical plane; and
    obtaining a direction of an incident ray of light from the object and its displacement corresponding to a respective pixel position.

6. An image processing program, embodied on a non-transitory computer-readable medium, for operating a computer for finding pixel positions of an object and detecting a position of the object from images captured by two cameras that are capable of imaging the object in wide-angle and are disposed on a straight line, for performing a process, the process comprising:
    projecting images inputted from the respective cameras on a cylindrical plane having an axial line disposed in parallel with the straight line on which the respective cameras are disposed;
    detecting the pixel positions corresponding to the object in the image projected on the cylindrical plane; and
    obtaining a direction of an incident ray of light from the object and its displacement corresponding to a respective pixel position.

* * * * *